United States Patent
Da (10) Patent No.: US 11,182,593 B2
(45) Date of Patent: Nov. 23, 2021

(54) IMAGE PROCESSING METHOD, COMPUTER DEVICE, AND COMPUTER READABLE STORAGE MEDIUM

(71) Applicant: GUANGDONG OPPO MOBILE TELECOMMUNICATIONS CORP., LTD., Guangdong (CN)

(72) Inventor: Jian Da, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 539 days.

(21) Appl. No.: 16/177,491

(22) Filed: Nov. 1, 2018

(65) Prior Publication Data
US 2019/0163960 A1 May 30, 2019

(30) Foreign Application Priority Data
Nov. 30, 2017 (CN) .......................... 201711240774.1

(51) Int. Cl.
*G06K 9/00* (2006.01)
*G06K 9/62* (2006.01)
*H04N 5/232* (2006.01)

(52) U.S. Cl.
CPC ..... *G06K 9/00281* (2013.01); *G06K 9/00288* (2013.01); *G06K 9/00302* (2013.01); *G06K 9/00677* (2013.01); *G06K 9/6219* (2013.01); *H04N 5/23219* (2013.01)

(58) Field of Classification Search
CPC combination set(s) only.
See application file for complete search history.

(56) References Cited

U.S. PATENT DOCUMENTS

| 2005/0111737 | A1* | 5/2005 | Das | G06F 16/54 382/190 |
| 2010/0125734 | A1* | 5/2010 | Cho | G06F 21/36 713/169 |
| 2013/0170738 | A1* | 7/2013 | Capuozzo | G06K 9/66 382/159 |
| 2017/0201591 | A1* | 7/2017 | Cho | H04L 67/22 |
| 2017/0251269 | A1* | 8/2017 | Yoshizawa | H04N 21/4415 |

FOREIGN PATENT DOCUMENTS

| CN | 1680939 | 10/2005 |
| CN | 104123339 | 10/2014 |

(Continued)

OTHER PUBLICATIONS

EPO, Communication for EP Application No. 18209192.6, dated Dec. 14, 2020.

(Continued)

*Primary Examiner* — Phung-Hoang J Nguyen
(74) *Attorney, Agent, or Firm* — Hodgson Russ LLP (57) ABSTRACT

Embodiments of the present disclosure provide an image processing method and apparatus, a computer device and a computer readable storage medium. The method includes: in response to detecting that a number of images in an image set to be processed exceeds a preset threshold, acquiring a first cluster dimension corresponding to the images in the image set; selecting a second cluster dimension from a plurality of pre-stored dimensions, the second cluster dimension being different from the first cluster dimension; and clustering the images in the image set according to the second cluster dimension to acquire a plurality of first image subsets of the image set.

19 Claims, 6 Drawing Sheets

(56) References Cited

FOREIGN PATENT DOCUMENTS

| CN | 104331509 |   | 2/2015 |
|----|-----------|---|--------|
| CN | 104615769 | * | 5/2015 |
| CN | 104850848 |   | 8/2015 |
| CN | 105472239 |   | 4/2016 |
| CN | 106648382 |   | 5/2017 |
| CN | 106649610 |   | 5/2017 |
| CN | 107209767 |   | 9/2017 |
| CN | 107943984 |   | 4/2018 |

OTHER PUBLICATIONS

IPI, Office Action for IN Application No. 201814044918, dated Nov. 26, 2020.
SIPO, First Office Action for CN Application No. 201711240774.1, dated Oct. 28, 2019.
SIPO, Second Office Action for CN Application No. 201711240774.1, dated Mar. 16, 2020.
SIPO, Decision of Rejection for CN Application No. 201711240774.1, dated May 29, 2020.
Cui et al., "EasyAlbum: An Interactive Photo Annotation System Based on Face Clustering and Re-ranking," CHI 2007 Proceedings, Photo Sharing, May 2007, pp. 367-376.
Obrador et al., "Supporting Personal Photo Storytelling for Social Albums," Proceedings of the 18th ACM international conference on Multimedia, Oct. 2010, pp. 561-570.
EPO, Office Action for EP Application No. 18209192, dated Apr. 25, 2019.
WIPO, English Translation of the ISR and WO for PCT/CN2018/118549, dated Mar. 7, 2019.

* cited by examiner

IMAGE PROCESSING METHOD, COMPUTER DEVICE, AND COMPUTER READABLE STORAGE MEDIUM

CROSS-REFERENCE TO RELATED APPLICATIONS

The present application claims priority to Chinese Patent Application No. 201711240774.1, filed on Nov. 30, 2017, the entire disclosure of which is incorporated herein by reference.

FIELD

The present disclosure relates to computer technologies, and more particularly to an image processing method, a computer device and a computer readable storage medium.

BACKGROUND

With development of smartphones, more and more users use smartphones to capture images. After capturing images, the smartphones can classify the images according to different dimensions, such as time dimension, location dimension, task dimension etc.

DISCLOSURE

Embodiments of the present disclosure provide an image processing method, a computer device and a computer readable storage medium.

The image processing method includes: in response to detecting that a number of images in an image set to be processed exceeds a preset threshold, acquiring a first cluster dimension corresponding to the images in the image set; selecting a second cluster dimension from a plurality of pre-stored dimensions, the second cluster dimension being different from the first cluster dimension; and clustering the images in the image set according to the second cluster dimension to acquire a plurality of first image subsets of the image set.

The computer device includes a memory and a processor. The memory has a computer readable instruction stored therein. When the instruction is executed by the processor, the processor is caused to perform the method described above.

The computer-readable storage medium has a computer program stored thereon. When the computer program is executed by a processor, the method described above is performed.

BRIEF DESCRIPTION OF THE DRAWINGS

To illustrate the solutions according to the embodiments of the present disclosure more clearly, accompanying drawings needed for describing the embodiments are briefly introduced below. Obviously, the accompanying drawings in the following descriptions are merely some embodiments of the present disclosure, and persons of ordinary skill in the art may obtain other drawings according to the accompanying drawings without making creative efforts.

EMBODIMENTS OF THE PRESENT DISCLOSURE

In order to make objectives, technical solutions and advantages of the present disclosure more clear, illustration will be made below with reference to drawings and embodiments. It should be understood that, specific embodiments described herein are merely used to explain the present disclosure, but are not used to limit the present disclosure.

Figure 1:
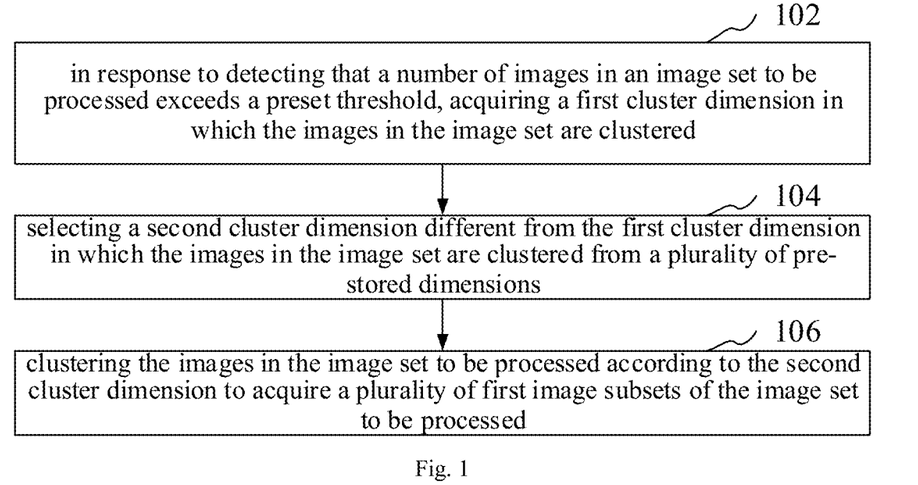
FIG. 1 is a flow chart of an image processing method according to an embodiment of the present disclosure.

FIG. 1 is a flow chart of an image processing method according to an embodiment of the present disclosure. As illustrated in FIG. 1, the image processing method includes the followings.

At block 102, in response to detecting that a number of images in an image set to be processed exceeds a preset threshold, a first cluster dimension corresponding to the images in the image set is acquired.

A computer device can perform multi-level clustering on stored images to generate a plurality of image sets having a parent-child relationship with each other. The computer device can determine a cluster level for each image set according to the parent-child relationship between the image sets. When the computer device detects that an image set has no parent image set, the image set is configured as a first level of image set. A child image set of the first level of image set is configured as a second level of image set. A child image set of the second level of image set is configured as a third level of image set . . . a child image set of the $N^{th}$ level of image set is configured as an $(N+1)^{th}$ level of image set, and so on. The cluster level can be determined for each image set generated by clustering. The first level of image set has a highest cluster level, and the $(N+1)^{th}$ level of image set has a lowest cluster level. The smaller the number representing the cluster level is, the higher the cluster level is. The bigger the number representing the cluster level is, the lower the cluster level is.

Figure 2:
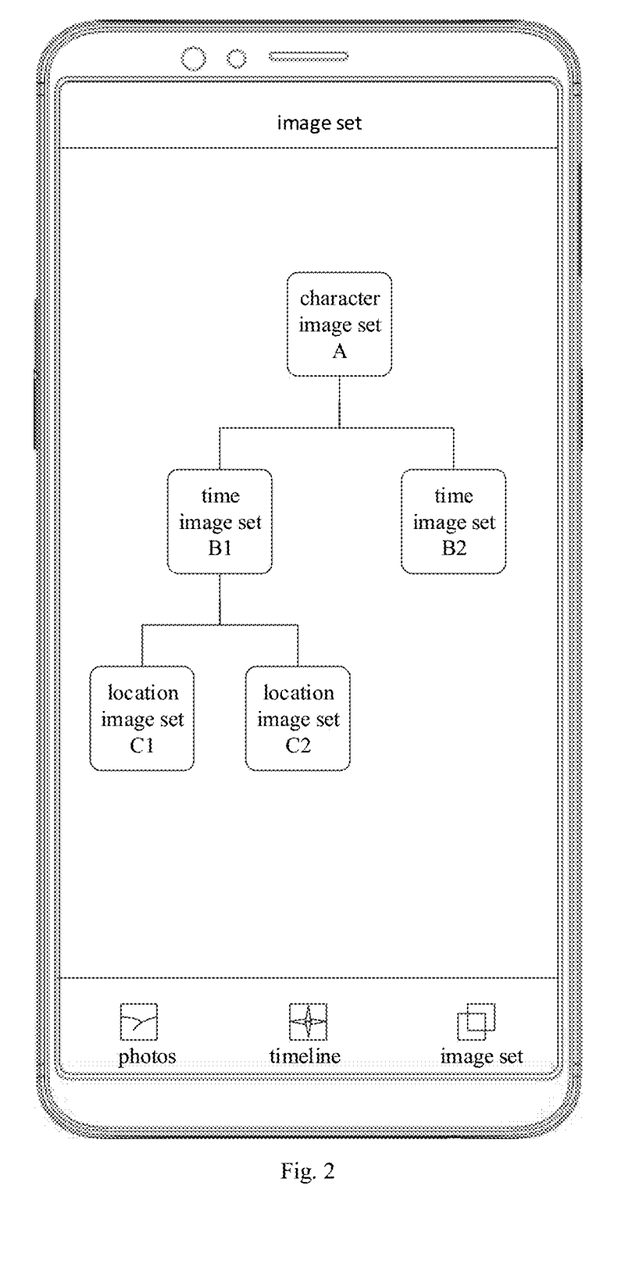
FIG. 2 is a schematic diagram of displaying multi-level clustered image sets in a computer interface according to an embodiment of the present disclosure.

As illustrated in FIG. 2, the computer device clusters the stored images according to a character dimension to generate a character image set A. Images in the character image set are clustered according to a time dimension to generate a time image set B1 and a time image set B2. When the time image set B1 has a large number of images, the computer device can cluster the images in the time image set B1 according to a location dimension to generate a location image set C1 and a location image set C2. The character image set A is a parent image set of the time image set B1 and the time image set B2. The time image set B1 is a parent image set of the location image set C1 and the location image set C2. The time image set B1 and the time image set B2 are child image sets of the character image set A. The location image set C1 and the location image set C2 are child image sets of the time image set B1. Since the character image set A has no parent image set, the character image set is configured as the first level of image set. The child image sets of the character image set A, i.e., the time image set B1 and the time image set B2 are configured as the second level of image sets. The child image sets of the time image set B1, i.e., the location image set C1 and the location image set C2 are configured as the third level of image sets.

When the computer device detects that the number of images in the image to be processed exceeds the preset threshold, a cluster tag corresponding to the image set to be processed can be acquired. The image set to be processed may be an image set with lowest level in the image sets generated by clustering. For example, the image sets generated by the computer device through clustering include the first level of image set, the second level of image set and the third level of image set. When the third level of image set has no child image set, the third level of image set can be considered as the image set with lowest level in the image sets generated by clustering.

When the computer device clusters the images according to a certain dimension, the cluster tag can be marked for each image set generated by clustering. The cluster tag includes the cluster dimension that has been applied to the images in the image set. When the computer device clusters images in a parent image set to generate a child image set, the cluster dimension applied to the child image set can be added to the cluster tag of the parent image set, and the processed cluster tag of the parent image set is configured as the cluster tag of the child image set. Thus, the cluster tag of the child image set includes the cluster tag of the parent image set.

At block 104, a second cluster dimension different from the first cluster dimension is selected from a plurality of pre-stored dimensions.

After the computer device acquires the cluster tag of the image set to be processed, the first cluster dimension (i.e., applied cluster dimension) applied to the images in the image set by the computer device can be acquired from the cluster tag. A plurality of dimensions can be stored in the computer device in advance. After the computer device acquires the applied cluster dimension, a dimension different from the applied cluster dimension can be acquired from the plurality of pre-stored dimensions as the second cluster dimension (i.e., cluster dimension to be applied). For example, the cluster tag of the image set to be processed includes following applied cluster dimensions: time dimension "year" indicating that the images are clustered with year as time unit, location dimension "province" indicating that the images are clustered with province as location unit. The computer device can select a scene dimension from the plurality of pre-stored dimensions as the cluster dimension to be applied.

When the computer device selects the cluster dimension to be applied from the plurality of pre-stored dimensions, if there are a plurality of dimensions different from the applied cluster dimension, the computer device can randomly select one of the plurality of dimensions different from the applied cluster dimension as the cluster dimension to be applied, or the computer device can select the first or last one of the plurality of dimensions different from the applied cluster dimension sorted in an order of dimension storage sequence, or the computer device can display the plurality of dimensions different from the applied cluster dimension on an interface of the computer device and select one dimension as the cluster dimension to be applied according to a selection instruction from a user.

At block 106, the images in the image set to be processed are clustered according to the second cluster dimension to acquire a plurality of first image subsets of the image set to be processed.

After acquiring the cluster dimension to be applied, the computer device can cluster the image set to be processed according to the cluster dimension to be applied. For different cluster dimensions to be applied, the computer device adopts different ways to cluster the images in the image set to be processed. When the cluster dimension to be applied is the character dimension, the computer device performs face recognition on the images in the image set to be processed, and clusters images containing a same face into an image subset. When the cluster dimension to be applied is the time dimension, the computer device can acquire a capturing time of each image in the image set to be processed and cluster the images according to the capturing time. When the cluster dimension to be applied is the location dimension, the computer device can acquire a capturing location of each image in the image set to be processed and cluster the images according to the capturing locations. When the computer device captures an image, if the computer device launches a locating service, such as GPS service, the computer device may record the capturing location in the captured image. When the cluster dimension to be applied is the scene dimension, the computer device can perform scene recognition on the images in the image set to be processed according to a scene recognition model and classify images in a same scene into an image subset. The scene recognition model may be a machine learning model or an artificial intelligence model.

In an embodiment, the computer device performs single-level classification on the stored images. When an image set has a large number of images, it is inconvenient for the user to browse the images. With the method according to an embodiment of the present disclosure, when the image set has a large number of images, the images in the image set can be clustered again, i.e., the multi-level clustering is performed on the stored images, such that the computer device performs more refined clustering on the images, thus improving convenience of browsing the images in the image set.

In an embodiment, detecting whether the number of the images in the image set to be processed exceeds the preset threshold may include: acquiring a cluster level of the image set, the cluster level being determined according to a parent-child relationship between the image set and other image sets generated by clustering; acquiring a threshold corresponding to the cluster level as the preset threshold; and detecting whether the number of images in the image set exceeds the preset threshold.

The computer device may perform the multi-level clustering on the stored images to generate a plurality of image sets having a parent-child relationship with each other. The computer device may determine the cluster level for each image set according to the parent-child relationship between the image sets. When the computer device detects that an image set has no parent image set, the image set is configured as a first level of image set. A child image set of the first level of image set is configured as a second level of image set. A child image set of the second level of image set is configured as a third level of image set . . . a child image set of the $N^{th}$ level of image set is configured as an $(N+1)^{th}$ level of image set, and so on. The cluster level can be determined for each image set generated by clustering. When the computer device performs the multi-level clustering on the stored images, the lower the cluster level corresponding to the image set is, the more refined classification can be performed by the computer device on the images, the less the number of images in the image set is. Therefore, the computer device can determine different thresholds for different cluster levels. After the computer device acquires the cluster level of the image set to be processed, the computer device can acquire the preset threshold corresponding to the cluster level and detect whether the number of images in the image set to be processed exceeds the preset threshold corresponding to the cluster level. When the number of images in the image set exceeds the preset threshold corresponding to the cluster level, the cluster tag corresponding to the image set to be processed is acquired. For example, the computer device sets the preset threshold corresponding to the first level of image set as 200, the preset threshold corresponding to the second level of image set as 150, the preset threshold corresponding to the third level of image set as 100. When the image set to be processed is the third level of image set, if the computer device detects that the number of images in the image to be processed exceeds 100, the cluster tag corresponding to the image set to be processed is acquired. In an embodiment, the preset thresholds corresponding to respective levels of image sets may be identical.

In an embodiment, when the computer device clusters the images, the number of images in the parent image set is higher than the number of images in the child image set. With the method according to the embodiment of the present disclosure, different preset thresholds can be set for the image sets with different cluster levels. The cluster level corresponding to the image set is detected. It is determined whether the images in the image set needs to be clustered according to the cluster level corresponding to the image set. In this way, differentiated processing can be performed on the respective levels of image sets, such that an intelligence of image clustering is improved.

In an embodiment, the applied cluster dimension being different from the cluster dimension to be applied refers to: a type of the applied cluster dimension being different from a type of the cluster dimension to be applied; or a type of the applied cluster dimension being identical to a type of the cluster dimension to be applied but a precision of image clustering corresponding to the applied cluster dimension being different from a precision of image clustering corresponding to the cluster dimension to be applied.

The computer device can determine different types of dimensions, including: scene dimension, time dimension, location dimension and character dimension or the like. The computer device can set sub dimensions for a same type of dimension. For example, the time dimension may include: "year", "month", "day", "hour", "minute", "second", which are sub dimensions belonging to the time dimension. The location dimension may include: "continent", "country", "province", "city", "district", "street", which are sub dimensions belonging to the location dimension. The scene dimension may include: "food", "building", "animal", "flower", which are sub dimensions belonging to the scene dimension. The sub dimensions under the same type of dimension have different precisions of image clustering.

When the computer device selects a type of the cluster dimension to be applied, the cluster dimension with a type different from the type of the applied cluster dimension can be selected. For example, when the applied cluster dimension is the character dimension and dimension "year" under the time dimension, the computer device selects dimension "province" under the location dimension as the cluster dimension to be applied. The computer device may also select a sub dimension different from the applied cluster dimension under the same type of dimension. For example, when the applied cluster dimension is "year" under the time dimension, dimension "month" under the time dimension can be selected as the cluster dimension to be applied.

The sub dimensions under the same type of dimension may have different precisions of image clustering. The computer device may set relationship between the sub dimensions according to the precisions of image clustering. The sub dimension with low precision may include the sub dimension with high precision. When the computer device acquires the cluster dimension to be applied, if the cluster dimension to be applied and the applied cluster dimension belong to the same type of dimension, the precision for the cluster dimension to be applied is higher than the precision for the applied cluster dimension. For example, under the time dimension, the precisions of image clustering for dimensions "year", "month", "day", "hour", "minute" and "second" satisfy: precision for "year"<precision for "month"<precision for "day"<precision for "hour"<precision for "minute"<precision for "second". When the applied cluster dimension is "month", the cluster dimension to be applied may be "day", "hour", "minute" or "second". Generally, the dimension with higher precision and adjacent to the applied cluster dimension can be selected as the cluster dimension to be applied. For example, when the applied cluster dimension is "month", dimension "day" can be selected as the cluster dimension to be applied.

Figure 3:
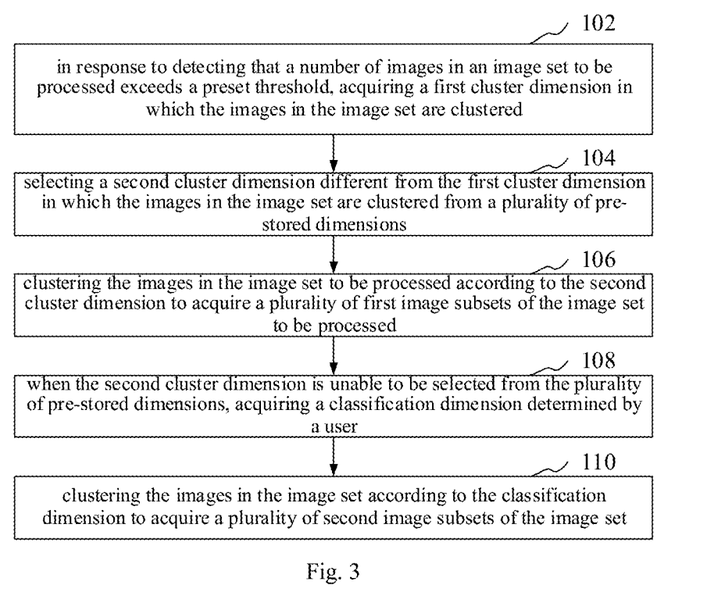
FIG. 3 is a flow chart of an image processing method according to another embodiment of the present disclosure.

In an embodiment, as illustrated in FIG. 3, the method further includes followings after block 106.

At block 108, when the second cluster dimension is unable to be selected from the plurality of pre-stored dimensions, a classification dimension determined by a user can be acquired.

At block 110, the images in the image set are clustered according to the classification dimension to acquire a plurality of second image subsets of the image set.

When the computer device cannot select the cluster dimension to be applied from the plurality of pre-stored dimensions, the computer device may acquire the classification dimension determined by the user. The images in the image set to be processed are clustered according to the classification dimension to acquire the plurality of second image subsets of the image set to be processed. The classification dimension includes: classification standard and classification precision. For example, the classification dimension is image size, including: classifying images each with image width lower than 640 dpi into an image subset, classifying images each with image width lower than 1600 dpi and higher than or equal to 640 dpi into an image subset, classifying images each with image width higher than or equal to 1600 dpi into an image subset.

In an embodiment, the computer device stores limited dimensions in advance. If the computer device stores a large number of images, when the computer device clusters the image set to be processed, the cluster dimension to be applied may not be acquired. With the method according to the embodiment of the present disclosure, the computer device may acquire the classification dimension determined by the user and cluster the image set to be processed according to the classification dimension which may be set by the user spontaneously, such that the personalization image clustering can be realized.

Figure 4:
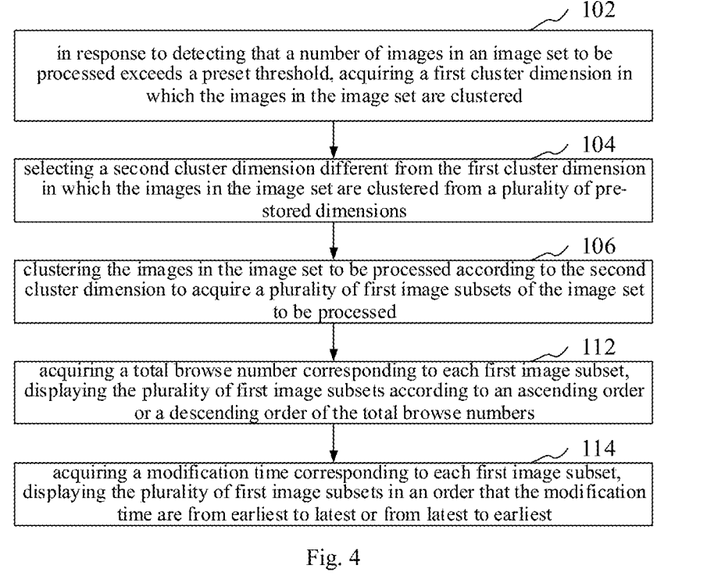
FIG. 4 is a flow chart of an image processing method according to a still embodiment of the present disclosure.

In an embodiment, as illustrated in FIG. 4, the method further includes followings after block 106.

At block 112, a total browse number corresponding to each first image subset is acquired, the plurality of first image subsets are displayed according to an ascending order or a descending order of the total browse numbers.

At block 114, a modification time corresponding to each first image subset is acquired, the plurality of first image subsets are displayed in an order that the modification time are from earliest to latest or from latest to earliest.

When the computer device displays a plurality of child image sets of a same parent image set, the plurality of child image sets can be displayed according to different orders. For example, the computer device may acquire the total browse number corresponding to each child image set, i.e., a sum of browse numbers of images in the child image set, and display the plurality of child image sets according to an ascending order or a descending order of the total browse numbers. The computer device may acquire the browse number corresponding to an image as follows. When the computer device detects one clicking operation acting on the image, the browse number corresponding to the image is added by 1. The computer device may display the plurality of child image sets in an order of the modification time. When the computer device creates a child image set, the create time of the child image set can be recorded. The create time is an original modification time. Once the child image set is updated, the computer device may update the modification time of the child image set. For example, when an image is added into the child image set, an image is deleted from the child image set or a keyword of the child image set is changed, the computer device may update the medication time of the child image set. The computer device may display the plurality of child image sets in an order that the modification time are from earliest to latest or from latest to earliest.

With the method according to the embodiment of the present disclosure, the computer device may display the child image sets of a parent image set according to different orders, for example displaying the image set that the user browses frequently or the user modifies recently at the top. The computer device may record the operations of the user and display the image sets according to the operations, such that the image sets can be displayed intelligently.

Figure 5:
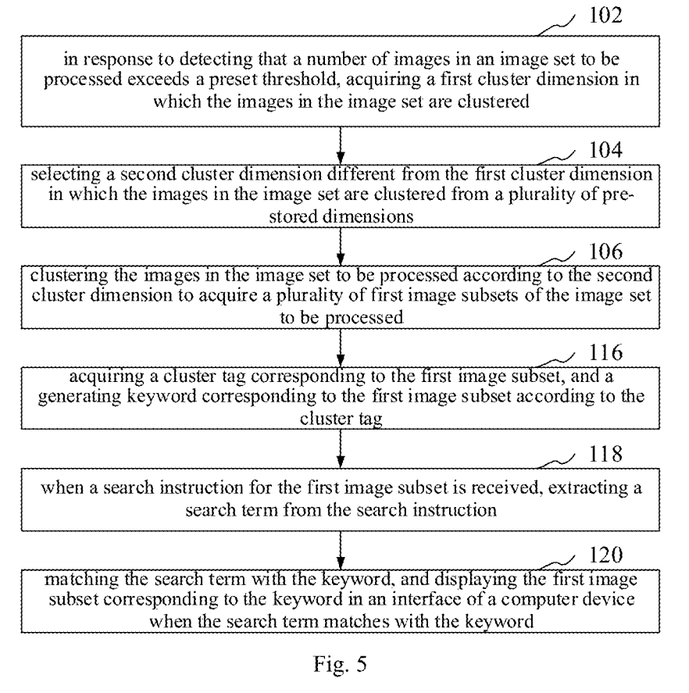
FIG. 5 is a flow chart of an image processing method according to a still another embodiment of the present disclosure.

In an embodiment, as illustrated in FIG. 5, the method further includes followings after block 106.

At block 116, a cluster tag corresponding to the first image subset is acquired, and a keyword corresponding to the first image subset is generated according to the cluster tag.

At block 118, when a search instruction for the first image subset is received, a search term is extracted from the search instruction.

At block 120, the search term is matched with the keyword, and the first image subset corresponding to the keyword is displayed in an interface of a computer device when the search term matches with the keyword.

The computer device may acquire the keyword corresponding to the image subset according to the applied cluster dimension in the cluster tag corresponding to the image subset. When the computer device receives the search instruction for the image subset, the search term is extracted from the search instruction. The search instruction may be a search instruction inputted in an album application, a search instruction inputted in a system search bar of the computer device, including a text instruction and a speech instruction.

When the search instruction is the text instruction, the computer device may extract the search term from the text instruction directly. When the search instruction is the speech instruction, the computer device may convert the speech instruction into text information and extract the search term from the text information. The computer device may match the search term with the keyword corresponding to the image subset. When the search time matches with the keyword, the interface of the computer device may jump to the album interface and display the image subset in the album interface. For example, the applied cluster dimensions corresponding to the image subset R include: "character" and "year". The keyword corresponding to the image subset R acquired according to the applied cluster dimensions may be "character A", "year 2015". When the computer device receives the text instruction "image, character A, year 2015" inputted in the system search bar, the computer device extracts "image" indicating that the search instruction for an image is acquired, and extracts the search terms "character A" and "year 2015" from the search instruction. Since the search terms match with the keyword, the computer device searches for the image subset R corresponding to the search terms "character A" and "year 2015", redirects the interface of the computer device to the album interface, and displays a cover image of the image subset R.

In an embodiment, the computer device may display the cover image of the image subset in an interface of the search bar. When a trigger operation for the cover image is detected, the images in the image subset may be displayed or the interface of the computer device is jumped to the album interface to display the images in the image subset.

With the method according to the embodiment of the present disclosure, the image set can be displayed according to the search instruction of the user, such that it is unnecessary for the user to search for the image set in the album interface, thus simplifying operations of browsing the image set and making the method of browsing the image set easier and faster.

In an embodiment, the method further includes followings after block 106.
(1) The image subset is encrypted and the cover image of the image subset is displayed in the interface of the computer device.
(2) When the trigger operation on the cover image is acquired, it is detected whether a decrypting instruction corresponding to the image subset is received.
(3) When the decrypting instruction is received, the images in the image subset can be displayed in the interface of the computer device.

The computer device may encrypt the image subset according to a received instruction of the user. The computer device may encrypt the image subset by a way of a password encryption, a pattern encryption, a fingerprint encryption, or a sound encryption. When the computer device displays the cover image of the image subset, if the trigger operation on the cover image is acquired, the computer device detects whether the decrypting instruction corresponding to the image subset is received. For example, if the computer device performs the password encryption on the image subset, the decrypting instruction is a corresponding password. When the computer device receives the decrypting instruction corresponding to the image subset, the images in the image subset are displayed in the interface of the computer device.

With the method according to the embodiment of the present disclosure, the computer device may encrypt the image subset. Only when the decrypting instruction is received, the images in the image subset can be browsed, thus improving safety and privacy of the images.

Figure 6:
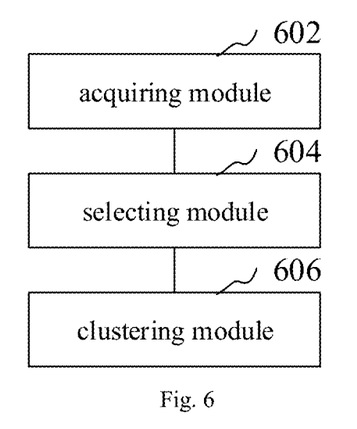
FIG. 6 is a block diagram of an image processing apparatus according to an embodiment of the present disclosure.

FIG. 6 is a block diagram of an image processing apparatus according to an embodiment of the present disclosure. As illustrated in FIG. 6, the image processing apparatus includes an acquiring module 602, a selecting module 604 and a clustering module 606.

The acquiring module 602 is configured to, in response to detecting a number of images in an image set to be processed exceeds a preset threshold, acquire a first cluster dimension corresponding to the images in the image set.

The selecting module 604 is configured to select a second cluster dimension from a plurality of pre-stored dimensions, the second cluster dimension being different from the first cluster dimension.

The clustering module 606 is configured to cluster the images in the image set according to the second cluster dimension to acquire a plurality of first image subsets of the image set.

Figure 7:
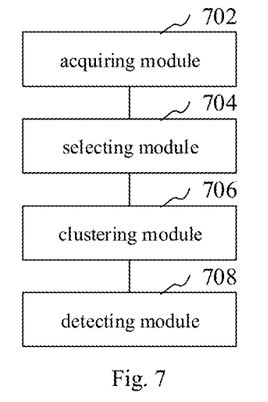
FIG. 7 is a block diagram of an image processing apparatus according to another embodiment of the present disclosure.

FIG. 7 is a block diagram of an image processing apparatus according to another embodiment of the present disclosure. As illustrated in FIG. 7, the image processing apparatus includes an acquiring module 702, a selecting module 704, a clustering module 706 and a detecting module 708. The acquiring module 702, the selecting module 704 and the clustering module 706 have the same functions as the corresponding modules illustrated in FIG. 6.

The detecting module 708 is configured to acquire a cluster level of the image set to be processed, to acquire a preset threshold corresponding to the cluster level as the preset threshold, and to detect whether the number of images in the image set to be processed exceeds the preset threshold.

In an embodiment, the first cluster dimension being different from the second cluster dimension refers to: a type of the second cluster dimension being different from a type of the first cluster dimension; or a type of the second cluster dimension being identical to a type of the first cluster dimension and a precision of image clustering corresponding to the second cluster dimension being different from a precision of image clustering corresponding to the first cluster dimension.

In an embodiment, the acquiring module 702 is further configured to acquire a classification dimension determined by a user when the second cluster dimension is unable to be selected from the plurality of pre-stored dimensions. The clustering module 706 is configured to cluster the images in the image set according to the classification dimension to acquire a plurality of second image subsets of the image set.

Figure 8:
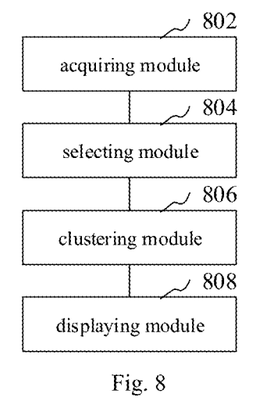
FIG. 8 is a block diagram of an image processing apparatus according to a still embodiment of the present disclosure.

FIG. 8 is a block diagram of an image processing apparatus according to a still embodiment of the present disclosure. As illustrated in FIG. 8, the image processing apparatus includes an acquiring module 802, a selecting module 804, a clustering module 806 and a displaying module 808. The acquiring module 802, the selecting module 804 and the clustering module 806 have the same functions as the corresponding modules illustrated in FIG. 6.

The displaying module 808 is configured to acquire a total browse number corresponding to each first image subset and to display the plurality of first image subsets according to an ascending order or a descending order of the total browse numbers.

In an embodiment, the displaying module 808 is configured to acquire a modification time corresponding to each first image subset and to display the plurality of first image subsets in an order that the modification time are from earliest to latest or from latest to earliest.

Figure 9:
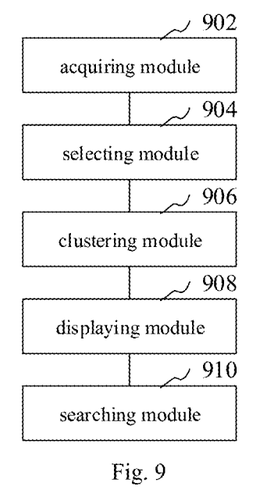
FIG. 9 is a block diagram of an image processing apparatus according to a still another embodiment of the present disclosure.

FIG. 9 is a block diagram of an image processing apparatus according to a still another embodiment of the present disclosure. As illustrated in FIG. 9, the image processing apparatus includes an acquiring module 902, a selecting module 904, a clustering module 906, a displaying module 908 and a searching module 910. The acquiring module 902, the selecting module 904, the clustering module 906 and the displaying module 908 have the same functions as the corresponding modules illustrated in FIG. 8.

The acquiring module 902 is configured to acquire a cluster tag corresponding to the first image subset and to generate a keyword corresponding to the first image subset according to the cluster tag.

The searching module 910 is configured to, when a search instruction for the first image subset is received, extract a search term from the search instruction.

The displaying module 908 is configured to match the search term with the keyword and to display the first image subset corresponding to the keyword in an interface of a computer device when the search term matches with the keyword.

In an embodiment, the displaying module 908 is further configured to: encrypt the first image subset and display a cover image of the first image subset in an interface of a computer device; in response to acquiring a trigger operation on the cover image, detect whether a decrypting instruction of the first image subset is received; and when the decrypting instruction is received, display images in the first image subset in the interface of the computer device.

The division of the above-mentioned image processing apparatus into modules is schematic. In other embodiments, the image processing apparatus can be divided into different modules according to requirements to implement all or a part of functions of the image processing apparatus.

Embodiments of the present disclosure also provide a computer-readable storage medium, such as one or more non-transitory computer-readable storage medium including computer executable instructions. When the computer executable instructions are executed by one or more processors, the one or more processors can be caused to perform the followings.

(1) In response to detecting that a number of images in an image set to be processed exceeds a preset threshold, a first cluster dimension corresponding to the images in the image set is acquired.

(2) A second cluster dimension is selected from a plurality of pre-stored dimensions, the second cluster dimension being different from the first cluster dimension.

(3) The images in the image set are clustered according to the second cluster dimension to acquire a plurality of first image subsets of the image set.

In an embodiment, detecting whether the number of images in the image set to be processed exceeds the preset threshold includes: acquiring a cluster level of the image set, the cluster level being determined according to a parent-child relationship between the image set and other image sets generated by clustering; acquiring a threshold corresponding to the cluster level as the preset threshold; and detecting whether the number of images in the image set exceeds the preset threshold.

In an embodiment, the second cluster dimension being different from the first cluster dimension refers to: a type of the second cluster dimension being different from a type of the first cluster dimension; or a type of the second cluster dimension being identical to a type of the first cluster dimension and a precision of image clustering corresponding to the second cluster dimension being different from a precision of image clustering corresponding to the first cluster dimension.

In an embodiment, the one or more processors are further configured to perform: when the second cluster dimension is unable to be selected from the plurality of pre-stored dimensions, acquiring a classification dimension determined by a user; and clustering the images in the image set according to the classification dimension to acquire a plurality of second image subsets of the image set.

In an embodiment, the one or more processors are further configured to perform: acquiring a total browse number corresponding to each first image subset and displaying the plurality of first image subsets according to an ascending order or a descending order of the total browse numbers; or acquiring a modification time corresponding to each first image subset and displaying the plurality of first image subsets in an order that the modification time are from earliest to latest or from latest to earliest.

In an embodiment, the one or more processors are further configured to perform: acquiring a cluster tag corresponding to the first image subset; generating a keyword corresponding to the first image subset according to the cluster tag; when a search instruction for the first image subset is received, extracting a search term from the search instruction; matching the search term with the keyword; and displaying the first image subset corresponding to the keyword in an interface of a computer device when the search term matches with the keyword.

In an embodiment, the one or more processors are further configured to perform: encrypting the first image subset and displaying a cover image of the first image subset in an interface of a computer device; in response to acquiring a trigger operation on the cover image, detecting whether a decrypting instruction of the first image subset is received; and when the decrypting instruction is received, displaying images in the first image subset in the interface of the computer device.

When a computer program product including instructions is executed on a computer, the computer is caused to perform the followings.
(1) In response to detecting that a number of images in an image set to be processed exceeds a preset threshold, a first cluster dimension corresponding to the images in the image set is acquired.
(2) A second cluster dimension is selected from a plurality of pre-stored dimensions, the second cluster dimension being different from the first cluster dimension.
(3) The images in the image set are clustered according to the second cluster dimension to acquire a plurality of first image subsets of the image set.

In an embodiment, detecting whether the number of images in the image set to be processed exceeds the preset threshold includes: acquiring a cluster level of the image set, the cluster level being determined according to a parent-child relationship between the image set and other image sets generated by clustering; acquiring a threshold corresponding to the cluster level as the preset threshold; and detecting whether the number of images in the image set exceeds the preset threshold.

In an embodiment, the second cluster dimension being different from the first cluster dimension refers to: a type of the second cluster dimension being different from a type of the first cluster dimension; or a type of the second cluster dimension being identical to a type of the first cluster dimension and a precision of image clustering corresponding to the second cluster dimension being different from a precision of image clustering corresponding to the first cluster dimension.

In an embodiment, the computer is further caused to perform: when the second cluster dimension is unable to be selected from the plurality of pre-stored dimensions, acquiring a classification dimension determined by a user; and clustering the images in the image set according to the classification dimension to acquire a plurality of second image subsets of the image set.

In an embodiment, the computer is further caused to perform: acquiring a total browse number corresponding to each first image subset and displaying the plurality of first image subsets according to an ascending order or a descending order of the total browse numbers; or acquiring a modification time corresponding to each first image subset and displaying the plurality of first image subsets in an order that the modification time are from earliest to latest or from latest to earliest.

In an embodiment, the computer is further caused to perform: acquiring a cluster tag corresponding to the first image subset; generating a keyword corresponding to the first image subset according to the cluster tag; when a search instruction for the first image subset is received, extracting a search term from the search instruction; matching the search term with the keyword; and displaying the first image subset corresponding to the keyword in an interface of a computer device when the search term matches with the keyword.

In an embodiment, the computer is further caused to perform: encrypting the first image subset and displaying a cover image of the first image subset in an interface of a computer device; in response to acquiring a trigger operation on the cover image, detecting whether a decrypting instruction of the first image subset is received; and when the decrypting instruction is received, displaying images in the first image subset in the interface of the computer device.

Figure 10:
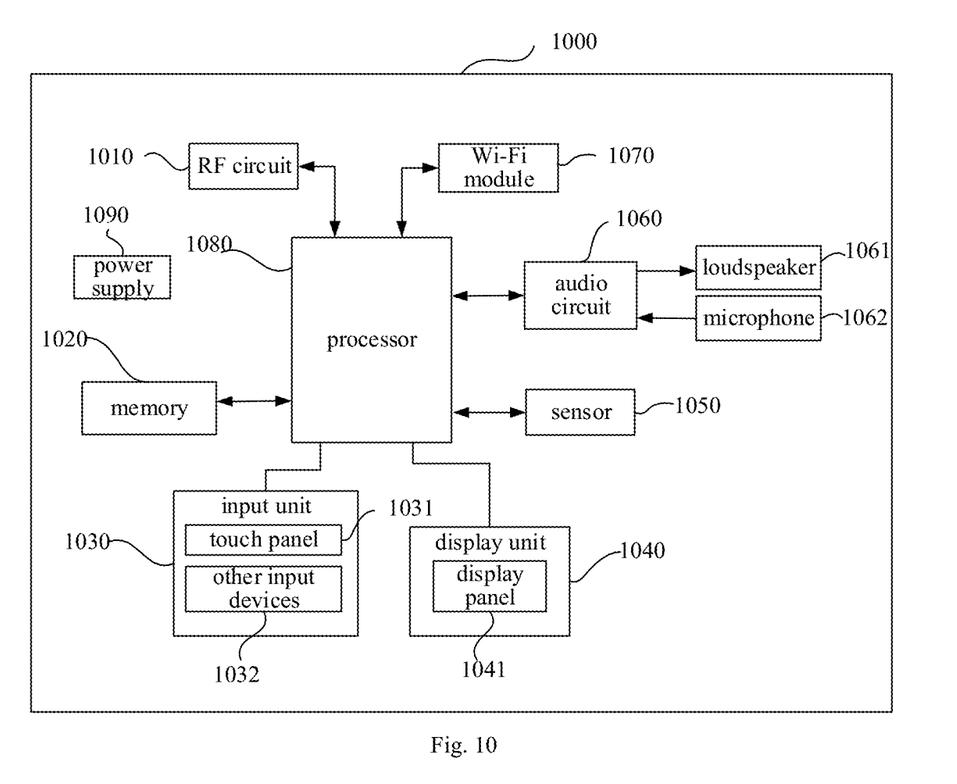
FIG. 10 is a block diagram of a partial structure of a mobile phone related to a computer device provided in an embodiment of the present disclosure.

Embodiments of the present disclosure also provide a computer device. As illustrated in FIG. 10, for the convenience of description, only parts related to the embodiments of the present disclosure are illustrated. Regarding details that are not disclosed, reference may be made to the method embodiments of the present disclosure. The computer device may be any terminal device including a mobile phone, a tablet computer, a PDA (personal digital assistant), a point of sales (POS), a car computer, a wearable device and the like. The computer device being a mobile phone is taken as an example.

FIG. 10 is a block diagram illustrating a partial structure of a mobile phone related to a computer device provided by an embodiment of the present disclosure. Referring to FIG. 10, the mobile phone includes: a radio frequency (RF) circuit 1010, a memory 1020, an input unit 1030, a display unit 1040, a sensor 1050, an audio circuit 1060, a wireless fidelity (Wi-Fi) module 1070, a processor 1080, a power supply 1090 and other components. It will be understood by those skilled in the art that the structure of the mobile phone illustrated in FIG. 10 does not constitute a limitation to the mobile phone, and may include more or less components than those illustrated, or some components may be combined, or the components may be arranged differently.

The RF circuit 1010 may be configured to receive and transmit signals during a process of transmitting and receiving a message or making a call. The RF circuit 1010 may be configured to receive downlink data from a base station and to transmit the downlink data to the processor 1080. Alternatively, the RF circuit 1010 may be configured to transmit uplink data to the base station. In general, the RF circuit includes but is not limited to an antenna, at least one amplifier, a transceiver, a coupler, a low noise amplifier (LNA), a diplexer and the like. Furthermore, the RF circuit 1010 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 1020 may be configured to store software programs or modules. The processor 1080 is configured to execute various functional applications and data processes of the mobile phone by running the software programs and modules stored in the memory 1020. The memory 1020 may mainly include a program storage region and a data storage region. The program storage region may store an operating system, at least one function required application (such as an application having a sound playing function, an application having an image playing function) and the like. The data storage region may store data produced by using the mobile phone (such as audio data, an address book) and the like. In addition, the memory 1020 may include a high speed random access memory and may include a non-volatility memory, such as at least one disk memory, a flash memory, or other volatility solid state memory.

The input unit 1030 may be configured to receive figure or character information inputted and generate a key signal input related to a user setup or function control of the mobile phone 1000. In detail, the input unit 1030 may include a touch panel 1031 and other input devices 1032. The touch panel 1031 (also called as touch screen) may be configured to gather touch operations near or on the touch panel 1031 (such as an operation on the touch panel 1031 or near the touch panel 1031 of the user with a finger, a stylus or other suitable objects or attachments), and drive corresponding coupled device according to a preset program. In an embodiment, the touch panel 1031 may include a touch detection device and a touch controller. The touch detection device detects an orientation of the user's touch, detects a signal caused by the touch operation and sends the signal to the touch controller. The touch controller receives the touch information from the touch detection device, converts the touch information to touch point coordinates, and sends the touch point coordinates to the processor 1080. Furthermore, the touch controller may receive and execute a command sent from the processor 1080. The touch panel 1031 may be implemented as a resistive type, a capacitive type, an infrared type and a surface acoustic wave type touch panel. In addition to the touch panel 1031, the input unit 1030 may further include other input devices 1032. In detail, the other input devices 1032 may include but are not limited to one or more of a physical keyboard, a functional key (such as a volume control key, a switch key and the like).

The display unit 1040 may be configured to display information inputted by the user or information provided to the user or various menus of the mobile phone. The display unit 1040 may include a display panel 1041. In an embodiment, the display panel 1041 may be configured as a liquid crystal display (LCD), an organic light-emitting diode (OLED) and the like. In an embodiment, the touch panel 1031 may cover the display panel 1041. When the touch panel 1031 detects the touch operation on the touch panel 1031 or near the touch panel 1031, the touch operation is transmitted to the processor 1080 to determine a type of the touch event. Thereafter, the processor 1080 provides a corresponding visual output on the display panel 1041 according to the type of the touch event. Although the touch panel 1031 and the display panel 1041 are two separate components in FIG. 10 to realize an input and output function of the mobile phone, in certain embodiments, the touch panel 1031 and the display panel 1041 may be integrated to realize the input and output function of the mobile phone.

The mobile phone 1000 may further include at least one sensor 1050, such as an optical sensor, a motion sensor and other sensors. In detail, the optical sensor may include a surrounding light sensor and a proximity sensor. The surrounding light sensor may adjust a brightness of the display panel 1041 according to surrounding lights. The proximity sensor may close the display panel 1041 and/or backlight when the mobile phone moves near ears of the user. The motion sensor may include an acceleration sensor. By the acceleration sensor the acceleration values in various directions can be measured, and a magnitude and a direction of gravity can be measured when the mobile phone is static. The acceleration sensor can be used in identifying a posture of the mobile phone (such as landscape/portrait screen switching), vibration recognition related functions (such as a pedometer, a knocking) and the like. Furthermore, the mobile phone may be configured with a gyroscope, a barometer, a hygrometer, a thermometer, an infrared sensor and other sensors.

The audio circuit 1060, a loudspeaker 1061 and a microphone 1062 may provide an audio interface between the user and the mobile phone. The audio circuit 1060 may receive audio data, convert the audio data to an electrical signal, and transmit the electrical signal to the loudspeaker 1061. The loudspeaker 1061 converts the electrical signal to a sound signal and output the sound signal. In another aspect, the microphone 1062 may convert gathered sound signals to electrical signals. The audio circuit 1060 receives and converts the electrical signals to audio data and outputs the audio data to the processor 1080 for processing. The audio data processed by the processor 1080 may be transmitted to another mobile phone via the RF circuit 1010 or may be stored in the memory 1020 for further processing.

Wi-Fi is a short distance wireless communication technology. The mobile terminal may help the user to receive or send an e-mail, browse webpages, access to stream medium via the Wi-Fi module 1080. The Wi-Fi module 1070 provides wireless broadband Internet access service to the user. Although the Wi-Fi module 1070 is illustrated in FIG. 10, it may be understood that, the Wi-Fi module 1070 is not essential for the mobile phone 1000, thus it may be omitted according to demands.

The processor 1080 is a control center of the mobile phone, which utilizes various interfaces and wires to couple various parts of the mobile phone. By running or executing the software program and/or modules stored in the memory 1020, and by invoking data stored in the memory 1020, the various functions and data processing functions may be executed, thus integrally monitoring the mobile phone. In an embodiment, the processor 1080 may include one or more processing units. In an embodiment, the processor 1080 may be integrated with an application processor and a modem processor. The application processor mainly processes the operating system, a user interface and an application. The modem processor mainly processes wireless communication. It may be understood that, the above modem processor may be not integrated in the processor 1080.

The mobile phone 1000 may further include a power supply 1090 (such as a battery) for providing power to various components of the mobile phone. Preferably, the power supply may be logically coupled to the processor 1080 via a power management system, thereby managing charging, discharging and power consumption via the power management system.

In an embodiment, the mobile phone 1000 may further include a camera, a Bluetooth module and the like.

In embodiments of the present disclosure, when the processor 1080 included in the mobile phone 1000 executes the computer programs stored in the memory, the processor 1080 performs the followings.

(1) In response to detecting that a number of images in an image set to be processed exceeds a preset threshold, a first cluster dimension corresponding to the images in the image set is acquired.

(2) A second cluster dimension is selected from a plurality of pre-stored dimensions, the second cluster dimension being different from the first cluster dimension.

(3) The images in the image set are clustered according to the second cluster dimension to acquire a plurality of first image subsets of the image set.

In an embodiment, detecting whether the number of images in the image set to be processed exceeds the preset threshold includes: acquiring a cluster level of the image set, the cluster level being determined according to a parent-child relationship between the image set and other image sets generated by clustering; acquiring a threshold corresponding to the cluster level as the preset threshold; and detecting whether the number of images in the image set exceeds the preset threshold.

In an embodiment, the second cluster dimension being different from the first cluster dimension refers to: a type of the second cluster dimension being different from a type of the first cluster dimension; or a type of the second cluster dimension being identical to a type of the first cluster dimension and a precision of image clustering corresponding to the second cluster dimension being different from a precision of image clustering corresponding to the first cluster dimension.

In an embodiment, the processor is further configured to perform: when the second cluster dimension is unable to be selected from the plurality of pre-stored dimensions, acquiring a classification dimension determined by a user; and clustering the images in the image set according to the classification dimension to acquire a plurality of second image subsets of the image set.

In an embodiment, the processor is further configured to perform: acquiring a total browse number corresponding to each first image subset and displaying the plurality of first image subsets according to an ascending order or a descending order of the total browse numbers; or acquiring a modification time corresponding to each first image subset and displaying the plurality of first image subsets in an order that the modification time are from earliest to latest or from latest to earliest.

In an embodiment, the processor is further configured to perform: acquiring a cluster tag corresponding to the first image subset; generating a keyword corresponding to the first image subset according to the cluster tag; when a search instruction for the first image subset is received, extracting a search term from the search instruction; matching the search term with the keyword; and displaying the first image subset corresponding to the keyword in an interface of a computer device when the search term matches with the keyword.

In an embodiment, the processor is further configured to perform: encrypting the first image subset and displaying a cover image of the first image subset in an interface of a computer device; in response to acquiring a trigger operation on the cover image, detecting whether a decrypting instruction of the first image subset is received; and when the decrypting instruction is received, displaying images in the first image subset in the interface of the computer device.

Any reference to the memory, the storage, the database, or any other medium as used herein may include a non-volatile memory and/or a volatile memory. The suitable non-volatile memory may include a ROM, a programmable ROM (PROM), an electrically programmable (EPROM), an electrically erasable programmable ROM (EEPROM) and a flash memory. The volatile memory may include a RAM, which is used as an external cache. As illustration and without limitation, RAM may be implemented in may forms, such as static RAM (SRAM), dynamic RAM (DRAM), synchronic DRAM (SDRAM), double data rate SDRAM (DDR SDRAM), enhanced SDRAM (ESDRAM), synchliink DRAM (SLDRAM), memory bus (Rambus), direct RAM (RDRAM), direct memory bus dynamic RAM (DRDRAM), and memory bus dynamic RAM (RDRAM).

Above embodiments merely illustrate some implementations of the present disclosure, which are described specifically and in detail, but do not constitute limitation to the scope of the present disclosure. It is to be noted that, those skilled in the art may make several modification and change without departing from the concept of the present disclosure, and these modification and change belong to the protection scope of the present disclosure. Thus, the protection scope of the present disclosure is defined by appending claims.

What is claimed is:

1. An image processing method, comprising:
   acquiring cluster levels for image sets based on a parent-child relationship between the image sets;
   acquiring number thresholds for the image sets based on the cluster levels;
   in response to detecting that a number of images in an image set to be processed exceeds the number threshold corresponding to the cluster level of the image set to be processed, acquiring a first cluster dimension corresponding to the images in the image set;
   selecting a second cluster dimension from a plurality of pre-stored dimensions, the second cluster dimension being different from the first cluster dimension; and
   clustering the images in the image set according to the second cluster dimension to acquire a plurality of first image subsets of the image set.

2. The method according to claim 1, wherein the plurality of pre-stored dimensions comprising a plurality of dimensions different from the first cluster dimension; and
   wherein selecting the second cluster dimension from the plurality of pre-stored dimensions comprises at least one of:
   selecting the second cluster dimension randomly from the plurality of dimensions different from the first cluster dimension;
   selecting the dimension ranked at the first in a preset order from the plurality of dimensions different from the first cluster dimension as the second cluster dimension; and
   selecting the second cluster dimension randomly from the plurality of dimensions different from the first cluster dimension according to a selection instruction.

3. The method according to claim 1, wherein the second cluster dimension being different from the first cluster dimension further comprises:
 a type of the second cluster dimension being different from a type of the first cluster dimension.

4. The method according to claim 1, wherein the second cluster dimension being different from the first cluster dimension further comprises:
 a type of the second cluster dimension being identical to a type of the first cluster dimension and a precision of image clustering corresponding to the second cluster dimension being different from a precision of image clustering corresponding to the first dimension.

5. The method according to claim 1, wherein clustering the images in the image set according to the second cluster dimension further comprises:
 when the second cluster dimension is a character dimension, performing face recognition on the images in the image set and classifying images containing a same face into one first image subset;
 when the second cluster dimension is a time dimension, acquiring a capturing time of each image in the image set and clustering the images according to the capturing time;
 when the second cluster dimension is a location dimension, acquiring a capturing location of each image in the image set and clustering the images according to the capturing locations; and
 when the second cluster dimension is a scene dimension, performing scene recognition on the images in the image set and classifying images in a same scene into one first image subset, the scene recognition model comprising a machine learning model and an artificial intelligence model.

6. The method according to claim 1, further comprising:
 when the second cluster dimension is unable to be selected from the plurality of pre-stored dimensions, acquiring a predetermined classification dimension ; and
 clustering the images in the image set according to the predetermined classification dimension to acquire a plurality of second image subsets of the image set.

7. The method according to claim 6, wherein the predetermined classification dimension comprises a classification standard and a classification precision.

8. The method according to claim 1, further comprising:
 acquiring a total browse number corresponding to each first image subset and displaying the plurality of first image subsets according to an ascending order or a descending order of the total browse numbers.

9. The method according to claim 8, wherein acquiring the total browse number corresponding to each first image subset further comprises:
 acquiring a browse number corresponding to each image in the first image subset; and
 calculating a sum of the browse number corresponding to each image to acquire the total browse number corresponding to each first image subset.

10. The method according to claim 9, wherein acquiring the browse number corresponding to each image in the first image subset further comprises:
 adding the browse number corresponding to the image by 1 when a clicking operation is detected on the image.

11. The method according to claim 1, further comprising:
 acquiring a modification time corresponding to each first image subset and displaying the plurality of first image subsets in an order that the modification time are from earliest to latest or from latest to earliest.

12. The method according to claim 1, further comprising:
 acquiring a cluster tag corresponding to the first image subset;
 generating a keyword corresponding to the first image subset according to the cluster tag;
 when a search instruction for the first image subset is received, extracting a search term from the search instruction;
 matching the search term with the keyword; and
 displaying the first image subset corresponding to the keyword in an interface of a computer device when the search term matches with the keyword.

13. The method according to claim 12, wherein extracting the search term from the search instruction further comprises:
 when the search instruction is a text instruction, extracting the search term from the text instruction directly; and
 when the search instruction is a speech instruction, converting the speech instruction into text information and extracting the search term from the text information.

14. The method according to claim 12, wherein displaying the first image subset corresponding to the keyword in the interface of the computer device comprises:
 displaying a cover image of the first image subset corresponding to the keyword; and
 displaying images in the first image subset corresponding to the keyword in response to detecting a trigger operation for the cover image.

15. The method according to claim 1, further comprising:
 encrypting the first image subset and displaying a cover image of the first image subset in an interface of a computer device;
 in response to acquiring a trigger operation on the cover image, detecting whether a decrypting instruction of the first image subset is received; and
 when the decrypting instruction is received, displaying images in the first image subset in the interface of the computer device.

16. The method according to claim 15, wherein encrypting the first image subset further comprises:
 encrypting the first image subset by any way of a password encryption, a pattern encryption, a fingerprint encryption and a sound encryption.

17. The method according to claim 1, further comprising:
 marking a cluster tag for each first image subset, the cluster tag indicating a cluster dimension applied to images in the first image subset.

18. A computer device, comprising a memory and a processor, wherein a computer-readable instruction is stored in the memory, when the computer-readable instruction is executed by the processor, the processor is caused to perform an image processing method, comprising:
 acquiring cluster levels for image sets based on a parent-child relationship between the image sets;
 acquiring number thresholds for the image sets based on the cluster levels;
 in response to detecting that a number of images in an image set to be processed exceeds the number threshold corresponding to the cluster level of the image set to be processed, acquiring a first cluster dimension corresponding to the images in the image set;
 selecting a second cluster dimension from a plurality of pre-stored dimensions, the second cluster dimension being different from the first cluster dimension; and clustering the images in the image set according to the second cluster dimension to acquire a plurality of first image subsets of the image set.

19. A non-transitory computer-readable storage medium, having a computer program stored thereon, wherein when the computer program is executed by a processor, the processor is caused to perform an image processing method, comprising:

acquiring cluster levels for image sets based on a parent-child relationship between the image sets;

acquiring number thresholds for the image sets based on the cluster levels;

in response to detecting that a number of images in an image set to be processed exceeds the number threshold corresponding to the cluster level of the image set to be processed, acquiring a first cluster dimension corresponding to the images in the image set;

selecting a second cluster dimension from a plurality of pre-stored dimensions, the second cluster dimension being different from the first cluster dimension; and clustering the images in the image set according to the second cluster dimension to acquire a plurality of first image subsets of the image set.

\* \* \* \* \*